(12) United States Patent
Lee

(10) Patent No.: US 11,982,380 B2
(45) Date of Patent: May 14, 2024

(54) SEALING MEMBER FOR CONNECTING PIPES

(71) Applicant: JUNGWOO METAL IND. CO., LTD., Yangju-si (KR)

(72) Inventor: Kwang Won Lee, Yangju-si (KR)

(73) Assignee: JUNGWOO METAL IND. CO., LTD., Yangju-si (KR)

( * ) Notice: Subject to any disclaimer, the term of this patent is extended or adjusted under 35 U.S.C. 154(b) by 680 days.

(21) Appl. No.: 16/325,397

(22) PCT Filed: Jan. 9, 2019

(86) PCT No.: PCT/KR2019/000341
§ 371 (c)(1),
(2) Date: Sep. 1, 2021

(87) PCT Pub. No.: WO2019/235709
PCT Pub. Date: Dec. 12, 2019

(65) Prior Publication Data
US 2021/0396335 A1 Dec. 23, 2021

(30) Foreign Application Priority Data

Jun. 8, 2018 (KR) .......................... 10-2018-0066303

(51) Int. Cl.
*F16L 21/03* (2006.01)
(52) U.S. Cl.
CPC .................... *F16L 21/03* (2013.01)
(58) Field of Classification Search
CPC .......... F16L 21/03; F16L 17/02; F16L 17/025
See application file for complete search history.

(56) References Cited

U.S. PATENT DOCUMENTS

| | | | | |
|---|---|---|---|---|
| 3,163,432 A | * | 12/1964 | De Boer ............... | F16L 17/025 277/626 |
| 3,368,830 A | * | 2/1968 | French .................. | F16L 21/022 285/423 |
| 3,520,047 A | * | 7/1970 | Jirka ...................... | F16L 47/08 277/924 |
| 3,584,889 A | * | 6/1971 | Sheets .................... | F16L 17/02 277/625 |
| 4,368,894 A | * | 1/1983 | Parmann ................ | F16L 21/03 29/451 |
| 4,371,179 A | * | 2/1983 | Bohman ................ | F16L 21/03 285/345 |

(Continued)

FOREIGN PATENT DOCUMENTS

KR 20-0382023 Y1 4/2005

*Primary Examiner* — David Bochna
(74) *Attorney, Agent, or Firm* — Revolution, IP, PLLC

(57) ABSTRACT

Disclosed is a sealing member for connecting pipes including a body portion provided between an outer surface of a pipe and an inner surface of a connector into which the pipe is inserted and formed in a ring shape by extending along a circumferential direction; and wing portions formed protruding from the body portion and contacting an area in contact with the outer surface of the pipe to be disposed spacing apart from each other on both sides along the width direction of the body portion, wherein the pipe is deformable by an external force in a state in which the wing portions are formed in line contact with the outer surface of the pipe, respectively.

7 Claims, 4 Drawing Sheets

(56) References Cited

U.S. PATENT DOCUMENTS

| | | | | |
|---|---|---|---|---|
| 7,475,918 | B2* | 1/2009 | Kaimer | ............... F16L 13/142 |
| | | | | 277/626 |
| 9,188,260 | B2* | 11/2015 | Spence | ............... F16L 13/142 |
| 10,415,726 | B2* | 9/2019 | Lee | ............... F16L 17/02 |
| 2005/0001388 | A1* | 1/2005 | Travers | ............... F16L 21/03 |
| | | | | 277/644 |
| 2016/0201830 | A1* | 7/2016 | Le Quere | ............... F16L 21/03 |
| | | | | 285/349 |
| 2021/0062944 | A1* | 3/2021 | Lee | ............... F16L 21/03 |
| 2021/0247003 | A1* | 8/2021 | Stogdill | ............... F16L 21/03 |

* cited by examiner

【Figure 1】
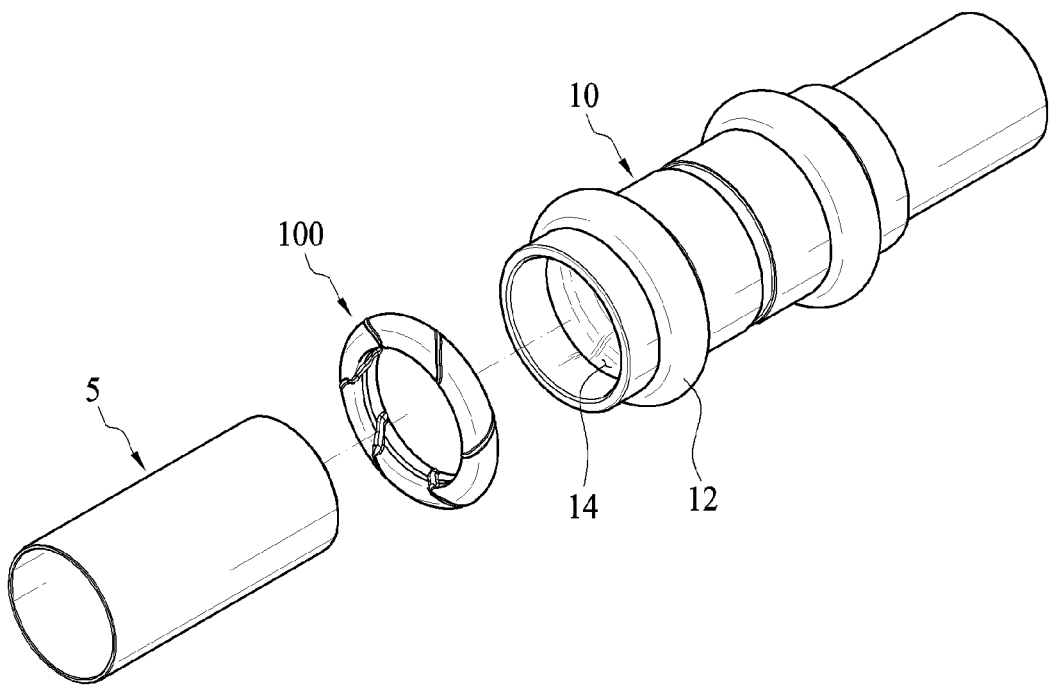
【Figure 2】
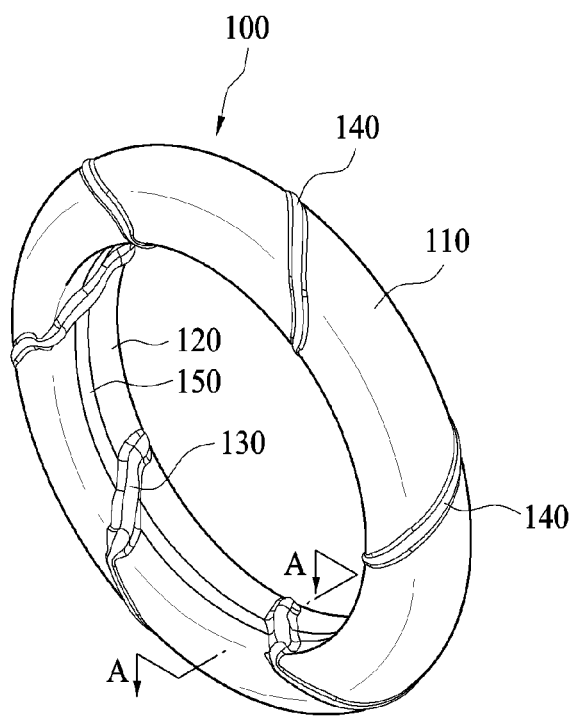

【Figure 3】
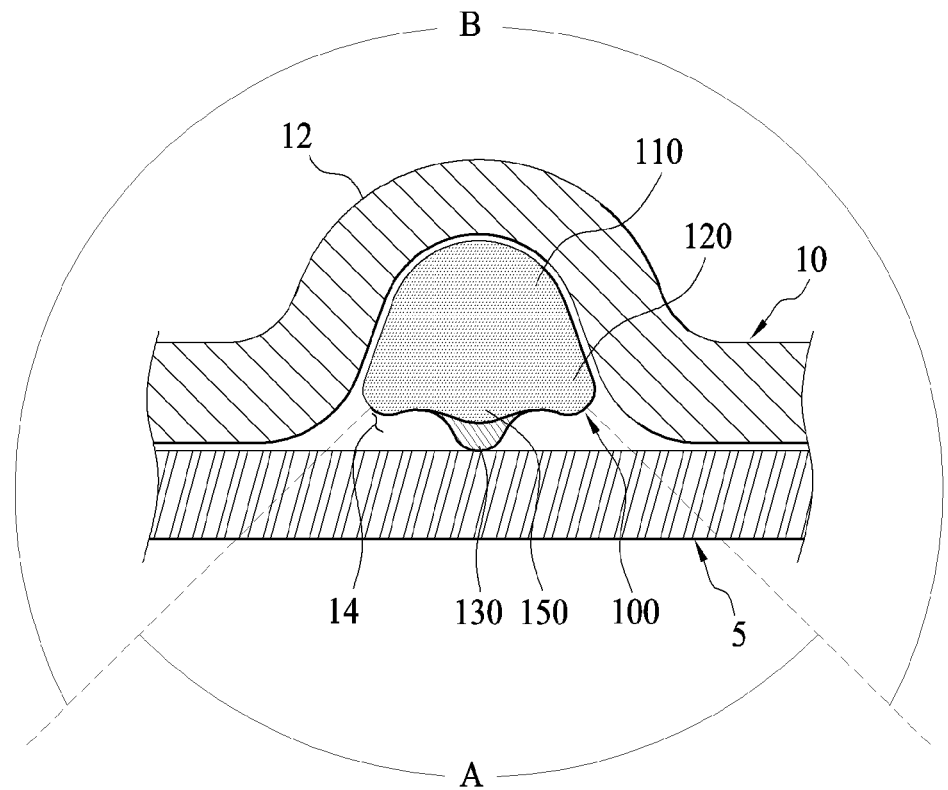
【Figure 4】
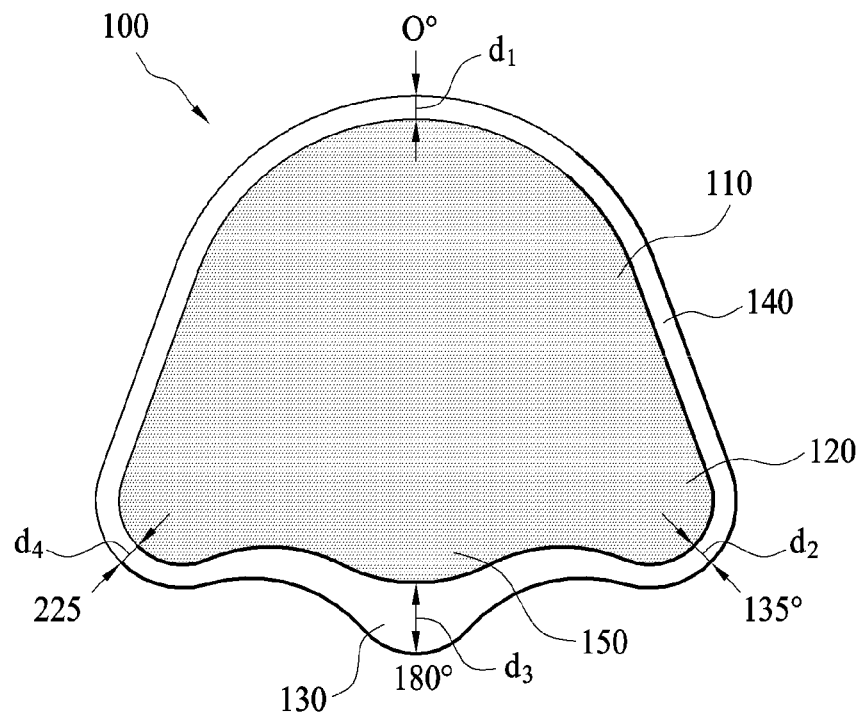

【Figure 5】
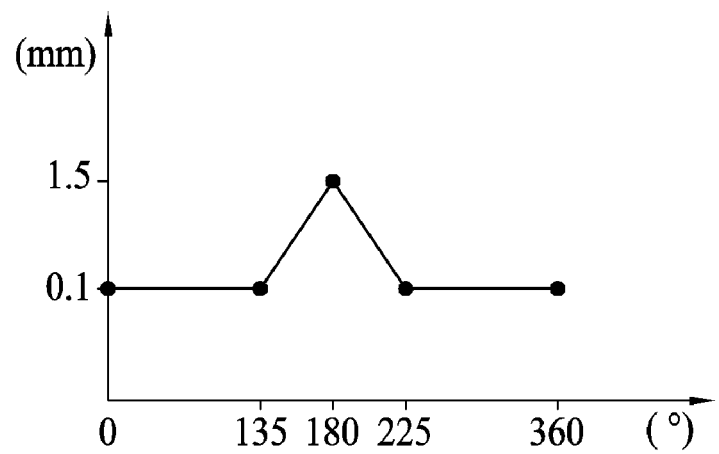
【Figure 6】
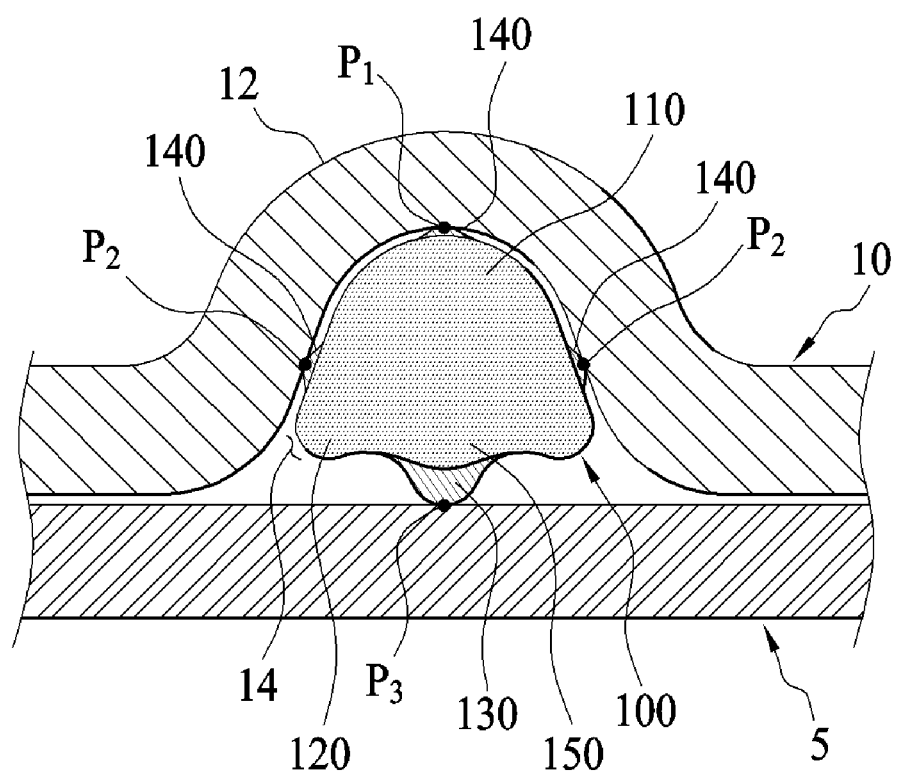

【Figure 7】
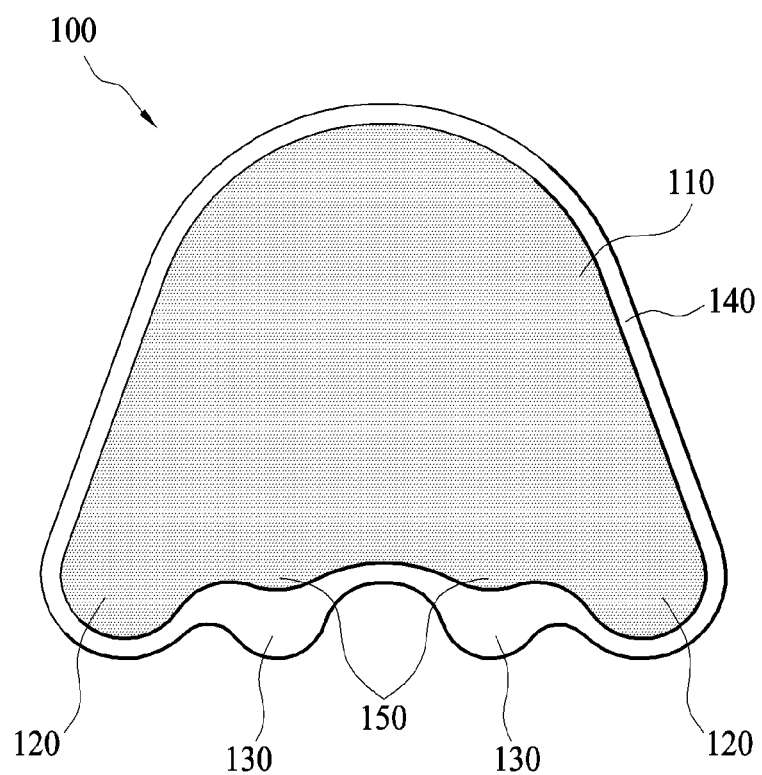

SEALING MEMBER FOR CONNECTING PIPES

TECHNICAL FIELD

The present invention relates to a sealing member for connecting pipes, and more particularly, to a sealing member for connecting pipes, in which a pair of spaced apart wing portions are formed, thereby greatly improving the water-stopping force.

BACKGROUND ART

In general, a pipe connector is used to connect various types of pipes constructed in the fields of construction and civil engineering. The pipe connector is formed in various shapes depending on the size and type of the pipe.

In the case of a large-diameter pipe connector, a housing space is formed inside the connector into which the pipe is inserted, and the housing space is provided with a water-stopping ring and a grip ring. Accordingly, after inserting the pipe into the inside of the connector, the grip ring is pressed and infiltrated into the outer surface of the pipe, thereby fixing the pipe.

In the case of a small-diameter pipe connector, a method is used in which a water-stopping ring is inserted into a groove formed along an inner circumference of a connector into which a pipe is inserted, and then a pipe is inserted and connected. In this case, the water-stopping ring presses an outer surface of the pipe and prevents leakage of the fluid flowing inside the pipe.

However, since the water-stopping ring used in the conventional small-diameter pipe connector is formed in a simple ring shape, it is difficult to obtain a complete water-stopping effect when the inner surface is not formed in a perfect circular shape. That is, the processing of the water-stopping ring needs to be performed very precisely, but due to the practical limitations in the manufacturing process, there are problems that the inner surface of the water-stopping ring is difficult to form a perfect circular shape and the quality deviation becomes large.

In addition, there is also a problem that abrasion easily occurs because continuous friction is applied only to the inner surface of the water-stopping ring by the entrance and exit of the pipe during the connection process.

Therefore, a method for solving such problems is required.

DISCLOSURE

Technical Problem

The present invention has been devised to solve the aforementioned conventional problems, and an aspect of the present invention provides a sealing member for connecting pipes in which an area in contact with a pipe is increased to remarkably improve a water-stopping force.

In addition, the present invention provides a sealing member for connecting pipes that minimizes the occurrence of wear due to tightening by reducing a contact point at the time of fastening with a pipe, thereby greatly increasing a lifespan.

The problems of the present invention are not limited to the above-mentioned problems, and other problems not mentioned can be clearly understood by those skilled in the art from the following description.

Technical Solution

According to an aspect of the present invention, there is provided a sealing member for connecting pipes including: a body portion provided between an outer surface of a pipe and an inner surface of a connector into which the pipe is inserted and formed in the form of a ring by extending along a circumferential direction; and a wing portion formed on a region of the body portion being in contact with the outer surface of the pipe with protruding therefrom and disposed spacing apart from each other on both sides along the width direction of the body portion, wherein the sealing member is deformable by an external force in a state in which the wing portions are in line contact with the outer surface of the pipe, respectively.

In addition, the wing portion may be formed by extending long along a longitudinal direction of the body portion.

In addition, an inner protruding portion that is located in a first region between the wing portions and formed protruding from the body portion toward the outer surface of the pipe may be further included.

Further, the inner protruding portion may be provided as at least one and spaced apart from each other.

Moreover, the inner protruding portion may be formed such that a protruding height is gradually higher from the wing portions on both sides to the center.

In addition, an outer protruding portion that is formed at a second region protruding from the body portion and contacting the inner surface of the connector along a longitudinal direction of the body portion may be further included.

In addition, the inner protruding portion and the outer protruding portion that constitute an infinite orbit to surround together a circumference of the wing portion and are connected to each other in a spiral manner may be formed along an outer surface of the body portion.

Further, the inner protruding portion is formed such that a height protruding from the body portion is comparatively higher than the outer protruding portion.

In addition, a sealing portion that is provided as at least one between the wing portions and is formed with protruding toward the pipe may be further included.

Further, the sealing portion has the same cross-sectional shape and may be formed long along a longitudinal direction of the body portion.

Moreover, the sealing portion is formed such that a protruding height is comparatively higher than the wing portions.

Advantageous Effects

The sealing member for connecting pipes according to the present invention to solve the aforementioned problems has the following effects.

According to an aspect of the present invention, an inner protruding portion and an outer protruding portion are formed in a spiral manner along an entire circumference of the sealing member, thereby remarkably improving the water-stopping force.

According to another aspect of the present invention, since the inner protruding portion with wing portions is in line multiple contacts with a pipe when contacting with the pipe, the contact area with the pipe is small, so that the burden on precision processing can be reduced and there is little variation in quality.

According to another aspect of the present invention, since the contact surface with the pipe is extremely small, there is an advantage that the occurrence of abrasion due to friction can be minimized.

The effects of the present invention are not limited to the aforementioned effects, and other objects that have not been mentioned will be able to be clearly understood by those skilled in the art from the description of the claims.

DESCRIPTION OF DRAWINGS

FIG. 1 is a perspective view showing a state in which a pipe is connected using a connector provided with a sealing member according to an embodiment of the present invention.

FIG. 2 is a perspective view showing a sealing member according to an embodiment of the present invention.

FIG. 3 is a cross-sectional view taken along line A-A in a state where a sealing member according to an embodiment of the present invention is inserted into an inside of a connector.

FIG. 4 is a view showing a height according to the position of a protruding portion in a sealing member according to an embodiment of the present invention.

FIG. 5 is a graph showing a change in height according to the position of a protruding portion in a sealing member according to an embodiment of the present invention. is shown;

FIG. 6 is a cross-sectional view of an outer end and an inner end of the protruding portion being simultaneously projected in a sealing member according to an embodiment of the present invention;

FIG. 7 is a view illustrating a modified form of a sealing member of the present invention.

BEST MODE

Hereinafter, embodiments of the invention will be described in detail with reference to the accompanying drawings. The drawings are attached hereto to help explain exemplary embodiments of the invention, and the present invention is not limited to the drawings and embodiments. In the drawings, some elements may be exaggerated, reduced in size, or omitted for clarity or conciseness.

FIG. 1 is a perspective view showing a state in which a pipe 5 is connected using a connector 10 provided with a sealing member 100 according to an embodiment of the present invention.

As shown in FIG. 1, a sealing member 100 is provided inside the connector 10 for connecting the pipe 5. When the pipe 5 is inserted into an inside the connector 10, the sealing member 100 prevents the fluid flowing inside the pipe 5 from leaking.

At this time, in this embodiment, the connector 10 is formed of a large-diameter portion 12 having a diameter larger than those of the other portions and a receiving groove 14 into which the sealing member 100 is received is formed inside the large-diameter portion 12. That is, the sealing member 100 according to the present invention presses the pipe 5 and the inner surface of the large diameter portion 12 at the same time in the state of being inserted into the receiving groove 14 to perform a water-stopping function.

Hereinafter, the sealing member 100 of the present invention will be described in detail with reference to FIGS. 2 to 4.

FIG. 2 is a perspective view showing a sealing member 100 according to an embodiment of the present invention and FIG. 3 is a cross-section view showing a state of a sectional surface of A-A in a state where a sealing member 100 is inserted into an inside of a connector 10 according to an embodiment of the present invention. FIG. 4 is a view showing a height according to the position of a protruding portion in a sealing member 100 according to an embodiment of the present invention.

As shown in FIG. 2, a sealing member 100 according to an embodiment of the present invention includes a body portion 110, a wing portion 120, an inner protruding portion 130, an outer protruding portion 140, and a sealing portion 150.

The body portion 110 is provided between an outer surface of a pipe 5 and an inner surface of a connector 10 into which the pipe 5 is inserted as described above and is formed by extending along a circumferential direction. That is, the body portion 110 is formed in a ring shape as a whole.

Meanwhile, in general, the body portion 110 may have a circular cross section. However, in the present invention, the body portion 110 is formed to have a curved shape together with the wing portion 120 described later, and the entire body has a uniform cross-sectional area.

In this embodiment, the body portion 110 is made of a material having elasticity and is provided so as to surround the outer surface of the pipe 5 inside the connector 10 and to apply pressure toward the center of the pipe 5 by the restoring force. That is, the size of the body portion 110 is formed to be relatively smaller than the outer diameter of the pipe 5 so as to enclose the periphery by interference fit.

Meanwhile, the wing portion 120 is formed with protruding on the body portion 110 and contacts the outer surface of the pipe 5, and is deformed by the pressure together with the body portion 110 and further provided so as to surround the pipe (5).

Specifically, the wing portion 120 protrudes toward a region where the wing portion 120 is in contact with the outer surface of the pipe 5 on the body portion 110 and is disposed on both sides of the body portion 110 along the width direction thereof. Here, the wing portions 120 are formed as a pair and are spaced apart from each other, thereby having a triangular cross-section as shown in FIG. 3, and the protruding end portions are in a line contact with the outer surface of the pipe 5.

At this time, the wing portion 120 has a uniform cross-sectional shape like the body portion 110 and is integrally formed with the body portions 110 to have a ring shape. Accordingly, each of the wing portions 120 is in a line contact with the outer surface of the pipe 5 while being spaced apart from each other.

The wing portions 120 are compressed and deformed in the direction of the center axis of the pipe 5 together with the body portion 110 by the connector 10 described above to be in close contact with the pipe. Here, as described above, the wing portion 120 is formed to extend long along the longitudinal direction of the body portion 110, and a pair of the wing portions 120 is spaced apart from each other, thereby blocking doubly the outer surface of the pipe 5.

Next, an inner protruding portion 130 is formed with protruding from the body portion 110 separately from the wing portions 120, and at least one inner protruding portion is provided. Here, the inner protruding portion 130 is formed with protruding toward the outer surface of the pipe 5 in a first area A between a pair of the wing portions 120.

Specifically, at least one of the inner protruding portion 130 may be formed with protruding into the first area A and may be disposed in a straight line, a diagonal line, or a spiral shape along the longitudinal direction of the body portion 110. At this time, the inner protruding portion 130 is disposed so as to be in contact with the outer surface of the pipe 5 separately from the wing portions 120 so as to be compressed and changed in shape.

In the present embodiment, the inner protruding portion 130 is formed to be relatively smaller than the wing portions 120 as illustrated in the figure, and is formed with protruding in such a manner as to surround at least a part of the wing portions 120 together at the first region A. Here, the inner protruding portion 130 is formed in a spiral shape in the first region A and connects both sides of the wing portions 120.

In addition, a part of the inner protruding portion 130 may be formed so as to surround a circumference of a part of the wing portions 120 as well. Accordingly, the inner protruding portion 130 is connected to the outer protruding portion 140 described later so as to form a spiral orbit.

An outer protrusion 140 is formed with protruding from the body portion 110 separately from the inner protrusion 130 and is provided on a second region B along the arc (a long circumference) of the body portion 110 with respect to the wing portions 120.

Specifically, the outer protrusion 140 protrudes on the body portion 110, is disposed at the second area B, and is configured to contact the inner surface of the connector 10. Here, at least one of the outer protruding portion 140 may be disposed spacing apart from each other and formed in a straight line, a diagonal line, or a spiral shape, as in the case of the inner protruding portion 130. And, the outer protruding portion 140 is formed to be continuous with the wing portions 120 on the second region B.

In the present embodiment, the outer protruding portion 140 is formed in a spiral shape to be continuous with the wing portions 120 at the second region B. At this time, a plurality of the outer protruding portions 140 are spaced apart from each other along the longitudinal direction of the body portion 110 and are formed in a shape similar to the outer protruding portions 140 described above.

Accordingly, the inner protruding portion 130 and the outer protruding portion 140 are formed with protruding separately from the body portion 110 and are provided at the first region A and the second region B, respectively, in which the circumference of the body portion 110 is divided with respect to the wing portion 120.

Meanwhile, the inner protruding portion 130 and the outer protruding portion 140 according to the present invention are disposed independently at the first region A and the second region B, respectively, and they are connected in a spiral shape to form an infinite orbit.

Specifically, the inner protruding portion 130 and the outer protruding portion 140 are connected to each other on the wing portion 120, and the inner protruding portion 130 and the outer protruding portion 140 are sequentially formed in a spiral shape along the circumference of the body portion 110 and the wing portion 120. Here, the inner protruding portion 130 and the outer protruding portion 140 may be additionally formed with protruding from at least a part of the wing portion 120 as well.

Accordingly, the outer protruding portion 140 and the inner protruding portion 130 are continuously and repeatedly disposed and are in a line contact with the outer surface of the pipe 5 and the inner surface of the connector 10 along the circumference thereof, respectively. That is, the outer protruding portion 140 and the inner protruding portion 130 are connected to each other over the entire circumference of the body 110 and the wing portion 120, and pass through the body portion 110 and the wing portion 120 at a predetermined distance. At this time, a part of each of the inner protruding portion 130 and the outer protruding portion 140 are connected by a period of the spirals, and one period of the spirals may be set to various lengths according to the design.

As such, the inner protruding portion 130 and the outer protruding portion 140 according to the present invention are provided at the first region A and the second region B and are continuously and repeatedly connected in a spiral shape to surround the body portion 110 and the wing portion 120.

Accordingly, as shown in FIG. 3, when the sealing member 100 according to the embodiment of the present invention is accommodated in the receiving groove 14 of the connector 10, the inner protrusion 130 contacts the pipe 5, Since FIG. 3 shows an A-A cross section in which the inner protrusion 130 passes between the wings 120 at the first region A, it shows a state in which the inner protrusion 130 is in contact with the outer surface of the pipe 5. The inner protrusion 130 and the outer protrusion 140 may have different protruding directions from each other in the section of other intervals not shown in the figure, and at this time the outer protrusion 140 and the inner protrusion 130 may portion may be in contact with the inner surface of the groove 14 and the outer surface of the pipe 5, respectively.

Since only the inner end of the entire length of the inner protrusion 130 is in contact with the outer surface of the pipe 5 in the present embodiment, the contact area between the sealing member 100 and the pipe 5, excluding the wing 120, is formed to be extremely small. Accordingly, it is possible to minimize the occurrence of wear due to friction caused by the movement of the pipe 5.

Therefore, since the contact area of the sealing member with the pipe 5 is extremely small due to the inner protrusion 130, the sealing member is formed together with the wing portion 120 at the first region A, thereby reducing the burden on precision machining and removing occurrence of the quality deviation.

The sealing member 100 of the present invention minimizes the contact area of the sealing member 100 with the pipe 5 but the outer protrusion 140 or the inner protrusion 130 is formed entirely on the inner surface of the receiving groove 14 or the pipe 5, it is possible to stably perform the water-stopping function.

The sealing portion 150 may be provided as at least one unit between the wing portions 120 on the body part 110 so as to supplement the water-stopping of the pipe 5 together with the wing portion 120, and further is protruded toward the pipe 5.

Specifically, the sealing portion 150 is formed on the body part 110 along the longitudinal direction of the body portion 110 and contacts the pipe 5 in the same manner as the wing portion 120. Here, the sealing portion 150 is in line contact with the outer surface of the pipe 5 together with the wing portion 120, and is deformed together with the wing portion 120, the inner protrusion 130 and the outer protrusion 140, when the external force is applied thereto, thereby water-stopping the outer surface of the pipe 5.

In the present embodiment, the sealing portion 150 is formed as one unit between the wing portions 120 with protruding and has the same cross-sectional shape and is arranged long along the body portion 110. At this time, the sealing portion 150 is formed as a single long body, but the body portion 110 may be provided as a plurality between the wing portions 120.

When the sealing portions 150 are formed as a plurality, it is preferable that the sealing portions 150 are spaced apart from each other at the first area A, and they are independently formed long along the body portion 110.

As described above, the sealing portion 150 formed as describe above contacts the pipe 5 together with the wing portion 120, thereby performing an water-stopping function. As shown in the figure, the inner protrusion 130 is formed on a portion of the sealing portion 150 along the lengthwise direction.

Referring to the drawing, the sealing portion 150 is configured, through which the inner protruding part 130 arranged in a helical shape passes, and the inner protruding portion 130 is formed to be further protruded on the sealing portion 150.

In addition, the sealing portion 150 may have a protruding height relatively lower than the wing portion 120. Referring to the drawing, when the pipe 5 and the wing portion 120 are in contact with each other, the sealing portion 150 performs a secondary blocking function to prevent leakage of the water together with the wing portion 120. Of course, depending on the shape, size, or use of the pipe 5, the sealing portion 150 may have the same protrusion height as the wing portion 120 or may protrude relatively more.

As described above, the sealing member 100 according to the present invention is in close contact with the pipe 5 through the wing portion 120 and the sealing portion 150, which protrude from the body 110 and stops water, and the inner protrusion 130 and the outer protrusion 140 can cut off completely between the pipe 5 and the connector 10.

Next, the sealing member 100 according to the present invention will be described in more detail with reference to FIGS. 4 to 6. FIG. 4 is a view showing a height according to the position of a protruding portion in a sealing member 100 according to an embodiment of the present invention, FIG. 5 is a graph showing a change in height according to the position of a protruding portion in a sealing member 100 according to an embodiment of the present invention. is shown, and FIG. 6 is a cross-sectional view of an outer end and an inner end of the protruding portion being simultaneously projected in a sealing member 100 according to an embodiment of the present invention.

As shown in FIG. 4, the inner protrusion 130 may have a height d3 of the central portion between the wing portions 120 that is higher than the heights d1 and d4 of both ends.

More specifically, in this embodiment, the height continuous from the opposite ends of the inner protrusion 130 to the outer protrusion 140, that is, the inner protrusion 130 has a relatively higher protrusion height than the outer protrusion 140.

The heights d2 and d4 of the parts formed on the wings 120 at both ends of the inner protrusions 130 are equal to the height d1 of the outer protrusions 140.

As shown therein, the inner protrusion 130 is formed such that the protrusion height gradually increases from both ends to the center.

Referring to FIG. 4, when the upper position of the outer protruding portion 140 is set to 0°, the position of the wing portion 120 formed on the right side along the clockwise direction is set to 135°, the position of the central portion of the inner protrusion 130 is set to 180°, and the position of the wing portion 120 formed on the left side is 225°, the change in the projecting height is the same as the graph of FIG. 5.

The outer protrusion 140 of the sealing member 100 according to the present embodiment has a uniform protrusion height and continues to the wing portion 120 without any change in height, and in a case of the inner protrusion 130, the height increases linearly from the both ends to the center. At this time, the heights of the outer protruding portion 140 and both side ends of the inner protrusions 130 is set to 1.5 mm, and the height of the center of the inner protrusion 130 is set to 0.1 mm.

However, it should be understood that the shape of the inner protrusion 130 and the outer protrusion 140 and the changes of the protrusion height may be different from those of the present embodiment. That is, the height of the inner protrusion 130 and the inner protrusion 130 may be varied. In particular, the height of the inner protrusion 130 may vary nonlinearly from both ends thereof to the center.

Thus, the inner protrusion 130 and the outer protrusion 140 have a difference in height of protrusion according to their positions, so that the pipe 5 and the connector 10 can be stably blocked.

Referring to FIG. 6, according to the present embodiment, the height of the central portion of the inner protrusion 130 is higher than the height of both end portions and the outer protrusion 140, as described above. The reason for doing this is to further improve the water-stopping power.

Specifically, the sealing member 100 is subjected to a pressure in a state where it is provided between the pipe 5 and the connector 10, and deformation is caused thereby. At this time, the region of the body portion 110 of the sealing member 100, where the wing portion 120, the inner protruding portion 130 and the inner protruding portion 130 are not formed can be in contact with the inner surface side of the receiving groove 14 due to the deformation. Therefore, three contact points P1, P2 and P3 are formed by the outer protrusion 140 around the sealing member 100, and a contact point is formed additionally due to the deformation of the body portion 110.

That is, along the circumference of the sealing member 100, the contact point due to deformation may occur at a location other than the outer protrusion 140 at the second area B and at most points three or more contact points with the receiving groove 14 are formed.

On the other hand, in a case of the first region A of the sealing member 100, only one contact point of the inner protrusion 130 formed on the wing portion 120 and the sealing portion 150, which is in contact with the pipe 5, is formed. That is, in the case of the pipe 5, since only the first region A of the sealing member 100 is contacted, it is necessary to further increase the strength of the inner protrusion 130 as compared with other portions.

Of course, in the case where the wing portion 120 is formed to be higher than the sealing portion 150 on the body portion 110, the wing portion 120 may have two points of contact, however, the number of points at which the sealing member contact the pipe 5 is smaller than the number of points at which the sealing member contact the connector 10.

Accordingly, the inner protrusion 130 is relatively higher than the outer protrusion 140, so that even if deformation due to compression occurs, the overall thickness of the inner protrusion 130 can be increased to increase the water-stopping force.

The sealing member 100 in accordance with the embodiment of the present invention may be in contact with the pipe 5 in multiple by the sealing portion 150 and the wing portion 120 even at the point where the inner protrusion 130 is not present so that stable contact is possible. Here, the inner protrusion 130 is formed to have a relatively small size as compared with the wing portion 120 so that the the inner protrusion 130 is deformed together when the sealing portion 150 and the wing portion 120 are compressed toward the pipe 5. For this reason, according to the present embodiment, the height of the inner protrusion 130 is made higher than the height of the outer protrusion 140 to improve the water-stopping force.

Next, a modified form of the sealing member 100 according to the present invention will be described with reference to FIG. 7.

As shown in the drawing, although the basic shapes of the sealing member are similar to each other, a plurality of the sealing portions 150 formed between the wing portions 120 are provided. As described above, the sealing portion 150 is formed to be long along the longitudinal direction of the body portion 110. When the sealing portion 150 is formed as a pair as in the present embodiment, the sealing portion 150 is formed to be long and separated from each other.

At this time, the sealing portion 150 is formed only at the first region A, and increases the point of contact with the pipe 5 together with the wing portion 120. Also, the inner protrusions 130 may be provided in a spiral shape at the pair of the sealing portions 150 to further increase the sealing performance.

It will be apparent to those skilled in the art that the present invention can be embodied in other specific forms without departing from the spirit or scope of the invention as defined in the appended claims. It is obvious to them. Therefore, the above-described embodiments are to be considered as illustrative rather than restrictive, and the present invention is not limited to the above description, but may be modified within the scope of the appended claims and equivalents thereof.

The invention claimed is:

1. A sealing member for connecting pipes, comprising:
    a body portion provided between an outer surface of a pipe and an inner surface of a connector into which the pipe is inserted and formed in the form of a ring by extending along a circumferential direction;
    wing portions formed on a region of the body portion and being in contact with the outer surface of the pipe, the wing portions protruding from opposite sides of the body portion along the width direction of the body portion;
    an inner protruding portion located at a first region between the wing portions and the body portion and protruding toward the outer surface of the pipe; and
    an outer protruding portion formed at a second region of the body portion and being in contact with the inner surface of the connector,
    wherein the sealing member is deformable by an external force in a state in which the wing portions are in line contact with the outer surface of the pipe, respectively, and
    the inner protruding portion and the outer protruding portion surround the circumference of the wing portions and are connected to each other in a spiral shape along an outer surface of the body portion.

2. The sealing member for connecting pipes of claim 1, wherein the wing portions are formed by extending along the longitudinal direction of the body portion.

3. The sealing member for connecting pipes of claim 1, wherein the inner protruding portion is formed such that a protruding height becomes higher gradually from the wing portions on both sides to the center.

4. The sealing member for connecting pipes of claim 1, wherein the inner protruding portion is formed such that a height protruding from the body portion is comparatively higher than the outer protruding portion.

5. The sealing member for connecting pipes of claim 1, further comprising a sealing portion formed between the wing portions and protruding toward the pipe.

6. The sealing member for connecting pipes of claim 5, wherein the sealing portion is formed along the longitudinal direction of the body portion.

7. The sealing member for connecting pipes of claim 5, wherein the sealing portion is formed such that a protruding height is comparatively higher than the wing portions.

\* \* \* \* \*